May 19, 1931.    G. H. E. DE RAM    1,805,466

FRICTIONAL SHOCK ABSORBER WITH HYDRAULIC CONTROL

Filed Sept. 11, 1928

G. H. E. De Ram
INVENTOR

By: Marks & Clark
Attys.

Patented May 19, 1931

1,805,466

UNITED STATES PATENT OFFICE

GEORGES HENRI ERNEST DE RAM, OF BOULOGNE-SUR-SEINE, FRANCE

FRICTIONAL SHOCK ABSORBER WITH HYDRAULIC CONTROL

Application filed September 11, 1928, Serial No. 305,271, and in France September 17, 1927.

The present invention relates to a shock-absorber for suspension springs operating by friction, its operation being controlled by a hydraulic device.

This shock-absorber consists essentially of a member with a cylindrical bore attached to the underframe for example and closed by caps at its two ends.

Inside said member a shaft can rotate, which is connected by a lever with the axle of the vehicle, and the rotation of which sets in motion a body of liquid filling the apparatus. A system of pistons and pipes is disposed in such manner that the displacements of the shaft are converted into pressure and vacuum results exerted in a chamber provided at one of the ends of the shaft. These pressures and vacua themselves result in the forcible application against the two caps of the shock-absorber of friction members located at the two ends of the shaft, or in their release. The oscillations of the shaft about its axis are thus converted into friction in a plane at right angles to this axis against the caps of the body of the apparatus.

The invention will be more clearly understood by reference to the accompanying drawings in which there is shown by way of example one construction of a shock-absorber in accordance with the invention.

The apparatus shown comprises a body member 1, attached to the underframe for example, this member being provided with a cylindrical bore, inside which the shaft 2 can rotate freely, and on one end of which is keyed the lever 3 to which are transmitted by any means the movements of the axle.

Figure 1:
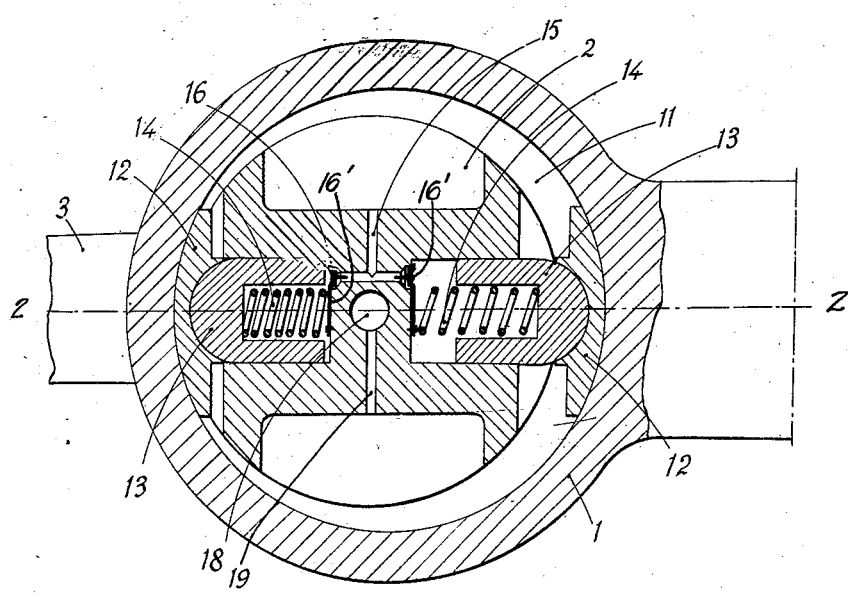
Fig. 1 is a sectional view taken through the piston.
Figure 2:
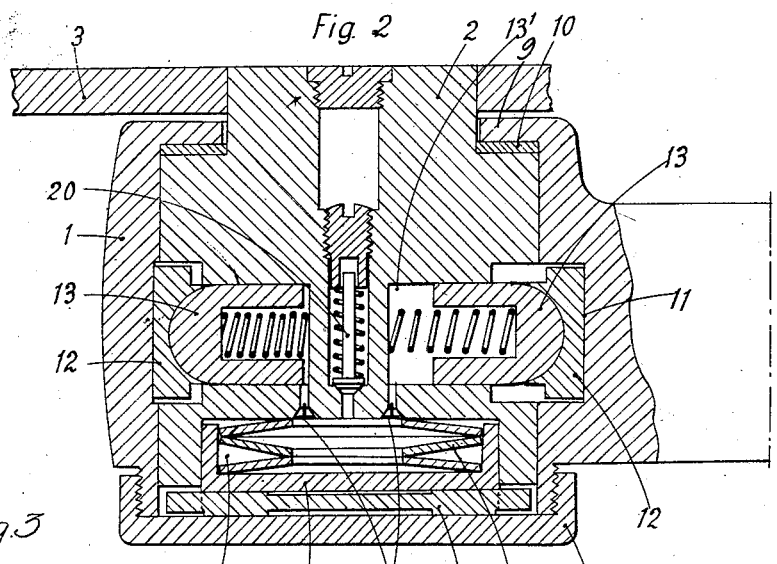
Fig. 2 is a section on the line 2—2 of Fig. 1.
Figure 3:
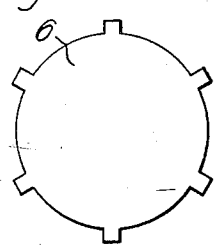
Fig. 3 is a plan view of the washer.

The shaft 2 has at its other end a cylindrical chamber 4 in which the piston 5 moves; this piston 5 is pressed constantly against a friction washer 6, keyed on the shaft 2 as shown in Fig. 2 thus allowing an axial movement of the washer with light friction. The pressure of the piston 5 upon the friction washer 6 is obtained by means of any resilient device 8 (spring, Belleville washer or the like) which is located in a cavity provided at the end of the shaft 2 and presses on one hand against the bottom of this cavity and on the other hand against the piston 5 movable in the same cavity.

The shaft 2 bears upon the body member 1, on the one hand, through the intermediary of the washer 6 against the threaded cap 7, and, on the other hand, on the side of the lever 3, against the flange 9 provided on the body member 1 a washer 10 being interposed to constitute a joint.

Figure 4:
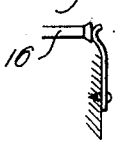
Fig. 4 is a detailed view of one of the valve holding springs.

Inside the body member 1 there is provided an eccentric or cam-shaped groove 11 in which the shoes 12 can move, said shoes being attached to one or more pistons 13, located in bores 13' made radially in the shaft 2; these pistons are constantly thrust against the groove 11 by springs 14, abutting on the one hand against said pistons and on the other hand against the bottoms of the bores 13'. The interior of the chambers 13', in which the small pistons move is in connection through passages 15 provided with valves 16 with the cylindrical chamber 4 bored in one end of the shaft 2 and containing the large piston 5. This chamber 4 communicates by passages 18 and 19 with a valve 20 or other escape device allowing the liquid to run out. Springs 16' are employed for holding the valve 16 in position. These springs are in the form of metallic clips as shown in Fig. 4. The valves 17 are of a check type permitting the passage of liquid in one direction only.

The operation of the apparatus is as follows:—

The displacement of the lever 3 due to the movements of the axle, causes the rotation of the shaft 2 inside the body member 1. This rotation causes the displacement of the pistons 13 in their chambers 13', the shoes 12 remaining constantly pressed on the bottom of the groove 11. When this displacement of the pistons occurs outwards, it produces a suction of the liquid, which fills the whole apparatus, through the passage 15 and the valves 16; a displacement in the reverse direction will force the liquid through the valves 17 towards the large piston 5, thereby exerting pressure upon the friction members 6 and 10. It is seen that the displacement of the small pistons causes, through the intermediary of hydraulic transmission, pressure of the large piston 5 upon the friction members 6 and 10, thus ensuring a braking which opposes the displacement of the lever 3 with respect to the body member 1.

The liquid subsequently flows out through the passages 18 and 19 and the escape device 20.

The purpose of the valve or escape device 20 is to allow the pressure of liquid in chamber 4 to return at a normal value when the pistons force no more liquid through the valves 17; then the liquid contained in the chamber 4 and pressing against the piston 5 escapes and new liquid does not pass by valves 17.

It is easily understood that the action of the shock-absorber depends solely upon the pressure behind the piston 5, which pressure depends upon the speed of displacement of the pistons 13 and which is greater, the higher this speed.

It is to be understood that the aforesaid details of construction are given only by way of example and that they may be modified without exceeding the scope of the invention. The essential feature is that the reciprocal oscillations of the cylindrical body member and of an inside shaft, one attached to the underframe and the other to the axle, are converted by the movements of a body of liquid, which applies or releases friction members interposed between the two ends of the shaft and the corresponding caps of the body member of the apparatus.

Claim:

A suspension shock-absorber for vehicles, adapted to be interposed between the underframe and the axle of the said vehicles, comprising a body member with a cylindrical bore, caps closing the said body member at its two ends, a shaft rotatable inside the cylindrical bore of the said body member, a chamber provided at one end of the said shaft, a piston reciprocable inside the said chamber parallel to the shaft, a friction member separating the said piston from the corresponding cap of the said body member, a friction member interposed between the end of the shaft opposite to the said piston and the other cap of the said body member, the cylindrical bore of the said body member having an eccentric groove, radial chambers made in the said shaft, small pistons located in the said chambers and also arranged in the said eccentric groove, passages connecting the said radial chambers with the said shaft chamber, whereby the relative rotation of the said body member and shaft displaces a body of liquid inside the said body member, which liquid acts upon the said friction members, so as to brake the rotation of the said shaft.

In testimony whereof I have signed this specification.

GEORGES HENRI ERNEST DE RAM.